(12) United States Patent
Gan

(10) Patent No.: US 6,551,747 B1
(45) Date of Patent: Apr. 22, 2003

(54) SANDWICH CATHODE DESIGN FOR ALKALI METAL ELECTROCHEMICAL CELL WITH HIGH DISCHARGE RATE CAPABILITY

(75) Inventor: Hong Gan, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/560,060

(22) Filed: Apr. 27, 2000

(51) Int. Cl.[7] .............................................. H01M 4/70
(52) U.S. Cl. ................. 429/245; 429/231.2; 429/231.7; 429/244; 429/233
(58) Field of Search ............................. 429/128, 231.7, 429/219, 209, 244, 231.2, 245, 233

(56) References Cited

U.S. PATENT DOCUMENTS

| | | | |
|---|---|---|---|
| 3,520,729 A | 7/1970 | Voss et al. ................ 136/20 |
| 4,324,828 A | 4/1982 | Ebato et al. .............. 429/209 |
| 5,180,642 A | 1/1993 | Weiss et al. ................ 429/90 |
| 5,571,636 A | 11/1996 | Ohta et al. ................ 429/218 |
| 5,582,935 A | 12/1996 | Dasgupta et al. .......... 429/218 |
| 5,667,916 A | 9/1997 | Ebel et al. ................ 429/218 |
| 5,670,276 A | 9/1997 | Takeuchi et al. .......... 429/219 |
| 5,716,422 A | 2/1998 | Muffoletto et al. ....... 29/623.5 |
| 5,744,258 A | * 4/1998 | Bai et al. ..................... 429/3 |
| 6,045,942 A | * 4/2000 | Miekka et al. ............. 429/124 |
| 6,258,473 B1 | * 7/2001 | Spillman et al. ............. 429/9 |

* cited by examiner

Primary Examiner—Carol Chaney
(74) Attorney, Agent, or Firm—Michael F. Scalise

(57) ABSTRACT

A new sandwich cathode design having a second cathode active material of a relatively high energy density but of a relatively low rate capability sandwiched between two current collectors and with a first cathode active material having a relatively low energy density but of a relatively high rate capability in contact with the opposite sides of the two current collectors, is described. The present cathode design is useful for powering an implantable medical device requiring a high rate discharge application.

33 Claims, 7 Drawing Sheets

SANDWICH CATHODE DESIGN FOR ALKALI METAL ELECTROCHEMICAL CELL WITH HIGH DISCHARGE RATE CAPABILITY

BACKGROUND OF THE INVENTION

1. Field of Invention

This invention relates to the conversion of chemical energy to electrical energy. In particular, the present invention relates to a new sandwich cathode design having a second cathode active material of a relatively high energy density but of a relatively low rate capability sandwiched between two current collectors and with a first cathode active material having a relatively low energy density but of a relatively high rate capability in contact with the opposite sides of the current collectors. The present cathode design is useful for powering an implantable medical device requiring a high rate discharge application.

2. Prior Art

Early ventricular cardiac defibrillators used two lithium electrochemical cells, in series, as their power source. However, the electronic circuit in current cardiac defibrillators now consume less energy than earlier models. This makes it possible for defibrillators today to use a single lithium cell as the power source. With a one cell design, the requirement for high current pulse capability, or power density, is even greater due to lowered pulsing voltage. A large electrode surface area is thus needed to accomplish this requirement. However, when the electrode surface area is increased, more inert materials (current collector, separator, etc.) are introduced into the cell. As a result, the cell's volumetric capacity is decreased. Another concern is the longevity of the medical device, which is dependent on the cell's capacity and power efficiency.

The capacity of an electrochemical cell is not only dependent on the electrode assembly design and packing efficiency, it also is dependent on the type of active materials used. For example, it is generally recognized that for lithium cells, silver vanadium oxide (SVO) and, in particular, ε-phase silver vanadium oxide ($AgV_2O_{5.5}$), is preferred as the cathode active material. This active material has a theoretical volumetric capacity of 1.37 Ah/ml. By comparison, the theoretical volumetric capacity of $CF_x$ material (x=1.1) is 2.42 Ah/ml, which is 1.77 times that of ε-phase silver vanadium oxide. However, for powering a cardiac defibrillator, SVO is preferred because it can deliver high current pulses or high energy within a short period of time. Although $CF_x$ has higher volumetric capacity, it cannot be used in medical devices requiring a high rate discharge application due to its low to medium rate of discharge capability.

The attempt to use high capacity materials, such as $CF_x$, by mixing it with a high rate cathode material, such as SVO, is reported in U.S. Pat. No. 5,180,642 to Weiss et. al. However, electrochemical cells made from such cathode composites have lower rate capability. The benefit of increasing the cell theoretical capacity by using $CF_x$ as part of the cathode mix is in part canceled by the lowering of its power capability in a high rate discharge application.

Another way to address the longevity issue is described in U.S. Pat. No. 5,614,331 to Takeuchi et al., which is assigned to the assignee of the present invention and incorporated hereby by reference. In this patent, a method of using a medium rate $CF_x$ cell to power the circuitry of an implantable defibrillator while simultaneously using a SVO cell to provide the power supply under high rate application for the device is described. The advantage of this method is that all of the high power SVO energy is reserved for the high power application such as charging a capacitor while the device monitoring function, for example for monitoring the heart beat, which require generally low power requirements, is provided by the high capacity $CF_x$ system. However, this battery construction requires a very careful design to balance the capacities of the high power cell (SVO) and the low power cell ($CF_x$) with both cells reaching end of service life at or near the same time. Such a balance, nevertheless, is very difficult to achieve due to the variable device usage requirements of a particular patient.

SUMMARY OF THE INVENTION

As is well known by those skilled in the art, an implantable cardiac defibrillator is a device that requires a power source for a generally medium rate, constant resistance load component provided by circuits performing such functions as, for example, the heart sensing and pacing functions. From time-to-time, the cardiac defibrillator may require a generally high rate, pulse discharge load component that occurs, for example, during charging of a capacitor in the defibrillator for the purpose of delivering an electrical shock to the heart to treat tachyarrhythmias, the irregular, rapid heartbeats that can be fatal if left uncorrected.

Accordingly, the object of the present invention is to improve the performance of lithium electrochemical cells by providing a new concept in electrode design. Further objects of this invention include providing a cell design for improving the capacity and utilization efficiency of defibrillator batteries, and to maintain the high current pulse discharge capability throughout the service life of the battery.

To fulfill these needs, a new sandwich cathode design is provided having a first cathode active material of a relatively high energy density but of a relatively low rate capability, for example $CF_x$, sandwiched between two current collectors and with a second cathode active material having a relatively low energy density but of a relatively high rate capability, for example SVO, in contact with the opposite sides of the current collectors. Such an exemplary cathode design might look like SVO/current collector/$CF_x$/current collector/SVO.

These and other objects of the present invention will become increasingly more apparent to those skilled in the art by reference to the following description and to the appended drawings.

DETAILED DESCRIPTION OF THE PREFERRED EMBODIMENTS

Figure 1:
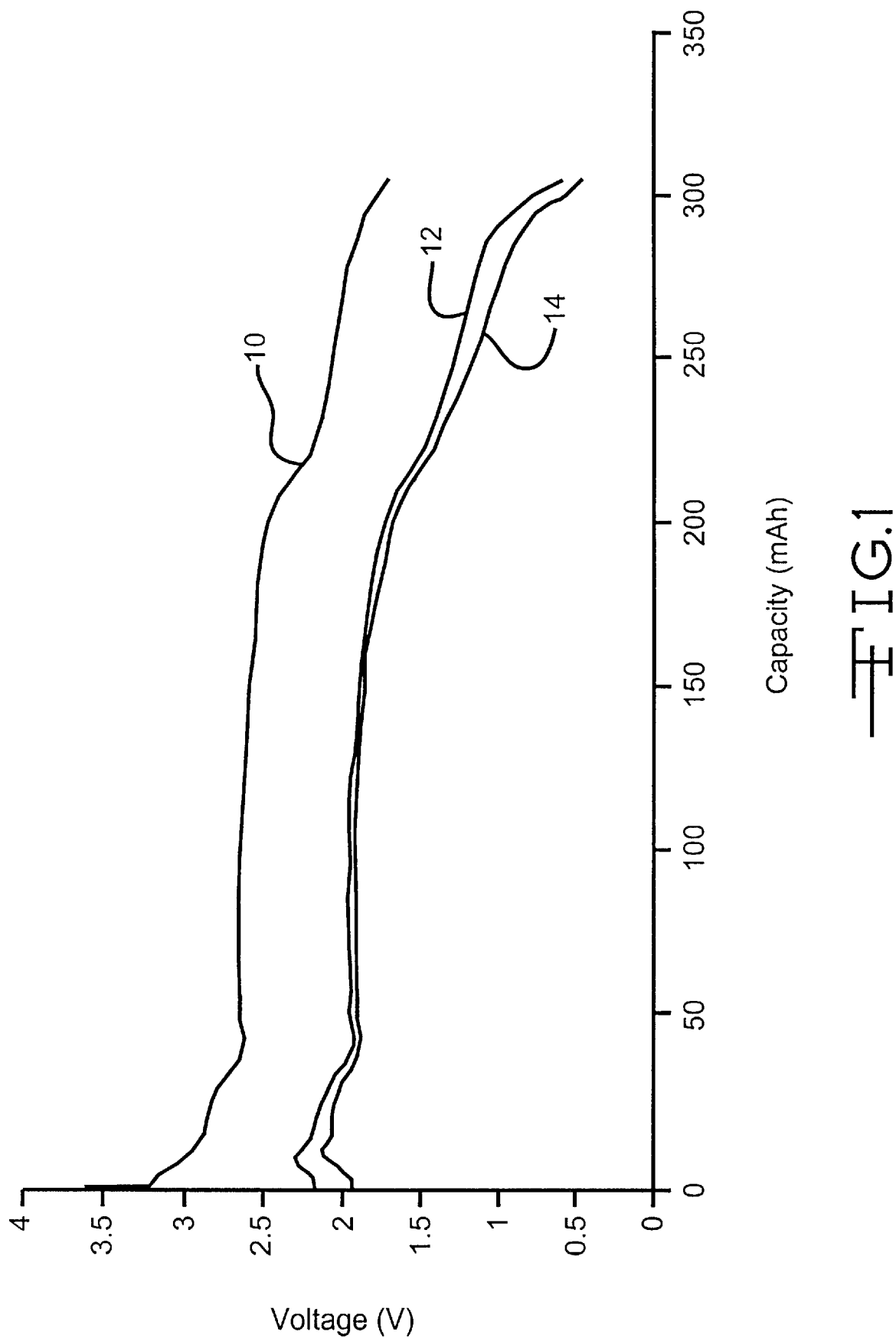
FIG. 1 is a graph of the pulse discharge results of a present invention lithium cell having a cathode of: SVO/current collector/$CF_x$.

As-used herein, the term "pulse" means a short burst of electrical current of a significantly greater amplitude than that of a pre-pulse current immediately prior to the pulse. A pulse train consists of at least two pulses of electrical current delivered in relatively short succession with or without open circuit rest between the pulses. An exemplary pulse train may consist of four 10 second pulses (23.2 mA/cm$^2$) with a 15 second rest between each pulse.

An electrochemical cell that possesses sufficient energy density and discharge capacity required to meet the vigorous requirements of implantable medical devices comprises an anode of a metal selected from Groups IA, IIA and IIIB of the Periodic Table of the Elements. Such anode active materials include lithium, sodium, potassium, etc., and their alloys and intermetallic compounds including, for example, Li-Si, Li-Al, Li-B and Li-Si-B alloys and intermetallic compounds. The preferred anode comprises lithium. An alternate anode comprises a lithium alloy such as a lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of electrically conductive material that serves as the other electrode of the cell. The cathode is preferably of solid materials and the electrochemical reaction at the cathode involves conversion of ions that migrate from the anode to the cathode into atomic or molecular forms. The solid cathode may comprise a first active material of a metal element, a metal oxide, a mixed metal oxide and a metal sulfide, and combinations thereof and a second active material of a carbonaceous chemistry. The metal oxide, the mixed metal oxide and the metal sulfide of the first active material has a relatively lower energy density but a relatively higher rate capability than the second active material.

The first active material is formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups, IB, IIB, IIIB, IVB, VB, VIB, VIIB and VIII, which includes the noble metals and/or other oxide and sulfide compounds. A preferred cathode active material is a reaction product of at least silver and vanadium.

One preferred mixed metal oxide is a transition metal oxide having the general formula $SM_xV_2O_y$ where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al., which is assigned to the assignee of the present invention and incorporated herein by reference.

Another preferred composite transition metal oxide cathode material includes $V_2O_z$ wherein $z \leq 5$ combined with $Ag_2O$ with silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. Nos. 5,472,810 to Takeuchi et al. and 5,516,340 to Takeuchi et al., both of which are assigned to the assignee of the present invention and incorporated herein by reference.

The sandwich cathode design of the present invention further includes a second active material of a relatively high energy density and a relatively low rate capability in comparison to the first cathode active material. The second active material is preferably a carbonaceous compound prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein the n refers to the number of monomer units which can vary widely.

In a broader sense, it is contemplated by the scope of the present invention that the first active material of the present sandwich cathode design is any material which has a relatively lower energy density but a relatively higher rate capability than the second active material. In addition to silver vanadium oxide and copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, copper oxide, copper vanadium oxide, and mixtures thereof are useful as the first active material, and in addition to fluorinated carbon, $Ag_2O$, $Ag_2O_2$, $CuF_2$, $Ag_2CrO_4$, $MnO_2$ and even SVO itself are useful as the second active material.

The true density and theoretical volumetric capacities of several active materials are listed in Table 1.

TABLE 1

| Material | True Density (g/ml) | Theoretical Capacity (Ah/ml) |
|---|---|---|
| $CF_x$ | 2.70 | 2.42 |
| $Ag_2O_2$ | 7.48 | 3.24 |

TABLE 1-continued

| Material | True Density (g/ml) | Theoretical Capacity (Ah/ml) |
|---|---|---|
| $Ag_2O$ | 7.14 | 1.65 |
| $AgV_2O_{5.5}$ | 4.34 | 1.37 |

The data in Table 1 indicate that $CF_x$, $Ag_2O_2$, $Ag_2O$, all have higher theoretical volumetric:capacities than that of SVO. It has also been determined that each of the silver-containing materials listed in Table 1 can be pressed into cohesive pellets that readily adhere to a current collector without the presence of binder and conductive additives. This means that $Ag_2O_2$ and $Ag_2O$ are useful as the first active material in sandwich cathode designs according to the present invention. In practice, it is extremely difficult to press electrode materials to their true density, and practical theoretical capacities are less than those listed in Table 1. Table 2 lists the practical densities and practical volumetric capacities of the above cathode materials based on experimental results.

TABLE 2

| Material | Practical Density (g/ml) | % of Theoretical True Density | Practical Capacity (Ah/ml) |
|---|---|---|---|
| $AgV_2O_{5.5}$ (94%) | 3.40* | 78.3 | 1.07 |
| $AgV_2O_{5.5}$ (100%) | 4.10 | 94.5 | 1.29 |
| $CF_x$ (91%) | 1.41* | 52.2 | 1.27 |
| $Ag_2O$ (100%) | 6.57 | 92.0 | 1.52 |
| $Ag_2O_2$ (100%) | 6.01 | 80.3 | 2.62 |

*Practical density of the active materials. The non-active materials including binders and conductive additives.

The data in Table 2 indicate that silver oxide materials provide greater discharge capacity than similar volumes of $CF_x$ and SVO materials. Pure SVO provides 21% more volumetric capacity than a cathode electrode formulation of 94% SVO, 3% PTFE binder and 3% of a conductive diluent. The capacity numbers listed in Table 2 are theoretical values based on complete reduction of each material.

Before fabrication into a sandwich electrode for incorporation into an electrochemical cell according to the present invention, the first and second cathode active materials prepared as described above are preferably mixed with a binder material such as a powdered fluoro-polymer, more preferably powdered polytetrafluoroethylene or powdered polyvinylidene flouride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material.

Cathode components for incorporation into an electrochemical cell according to the present invention may be prepared by rolling, spreading or pressing the first and second cathode active materials onto a suitable current collector selected from the group consisting of stainless steel, titanium, tantalum, platinum, gold, aluminum, cobalt nickel alloys, nickel-containing alloys, highly alloyed ferritic stainless steel containing molybdenum and chromium, and nickel-, chromium- and molybdenum-containing alloys. The preferred current collector material is titanium, and most preferably the titanium cathode current collector has a thin layer of graphite/carbon material, iridium, iridium oxide or platinum applied thereto. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the sandwich cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active materials. Preferably, the ion forming alkali metal salt is similar to the alkali metal comprising the anode.

In the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$ and $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte is 0.8M to 1.5M LiAsF$_6$ or LiPF$_6$ dissolved in a 50:50 mixture, by volume, of propylene carbonate as the preferred high permittivity solvent and 1,2-dimethoxyethane as the preferred low viscosity solvent.

According to the present invention, SVO cathode material, which provides a relatively high power or rate capability but a relatively low energy density or volumetric capability and CF$_x$ cathode material, which has a relatively high energy density but a relatively low rate capability, are individually pressed on opposite sides of a current collector screen, so that both materials are in direct contact with the current collector. Therefore, one exemplary cathode plate has the following configuration:

SVO/current collector/CF$_x$/current collector/SVO

An important aspect of the present invention is that the high rate cathode material (in this case the SVO material) maintains direct contact with the current collector. Another embodiment of the present invention has the high capacity/low rate material sandwiched between the high rate cathode material, in which the low rate/high capacity material is in direct contact with the high rate material. This cathode design has the following configuration:

SVO/current collector/SVO/CF$_x$/SVO/current collector/SVO

Another important aspect of the present invention is that the high capacity material having the low rate capability is preferably positioned between two layers of high rate cathode material (either high or low capacities). In other words, the exemplary CF$_x$ material never directly faces the lithium anode. In addition, the low rate cathode material must be short circuited with the high rate material, either by direct contact as demonstrated above in the second embodiment, or by parallel-connection through the current collectors as in the first illustrated embodiment above.

Since CF$_x$ material has significantly higher volumetric capacity than that of SVO material, i.e., approximately 1.77 times greater, in order to optimize the final cell capacity, the amount of CF$_x$ material should be maximized and the amount of SVO material used in each electrode should be minimized to the point that it is still practical in engineering and acceptable in electrochemical performance.

Further, end of service life indication is the same as that of a standard Li/SVO cell. And, it has been determined that the SVO electrode material and the CFx electrode material according to the present invention reach end of life at the same time. This is the case in spite of the varied usage in actual defibrillator applications. Since both electrode materials reach end of service life at the same time, no energy capacity is wasted.

The following examples describe the manner and process of an electrochemical cell according to the present invention, and they set forth the best mode contemplated by the inventors of carrying out the invention, but they are not to be construed as limiting.

EXAMPLE I

An electrochemical cell according to the present invention contained cathode no. 1 having 0.3 grams of a Ag$_2$V$_4$O$_{11}$ (SVO) cathode mix consisting of 94% active SVO, 3% of a PTFE binder and 3% of a carbonaceous diluent, by weight, pressed on one side of a cathode current collector (titanium screen, ~4.5 cm$^2$) under 32 tons. The other side of the current collector had 0.2 grams of a CF$_x$ mix containing 91% active CF$_x$, 5% of a PTFE binder and 4% of a carbonaceous diluent pressed thereon under 32 tons.

A jar cell no. 1 was assembled with the SVO side of cathode no. 1 facing a lithium anode and two layers of polypropylene separator disposed between the cathode and the anode. Cell no. 1 was activated with an electrolyte of 1.0M LiAsF$_6$/PC:DME=1:1. The theoretical capacity of this cell was calculated to be 251.9 mAh at a 2.0V background voltage cutoff.

Jar cell no. 1 was then pulse discharged under 114 mA pulsing current (25.4 mA/cm$^2$). The pulse trains consisted of four 10 second pulses with a 15 second rest between pulses. The pulse trains were applied to the cell every 30 minutes. The test results are summarized in FIG. 1, which correlates cell discharge capacity and cell voltages minus pre-pulse potentials (curve 10), pulse 1 minimum potentials (curve 12) and pulse 4 minimum potentials (curve 14), respectively. FIG. 1 clearly shows that cell no. 1 of the present invention delivered the expected theoretical capacity at a 2.0V background voltage cut off. In addition, the present invention cell provided acceptable power capability by maintaining high pulse minimum potentials under high current pulsing (25.4 mA/cm$^2$). Accordingly, this example clearly demonstrates the improvement of using a SVO/CF$_x$ sandwich cathode in a high rate, lithium electrochemical cell.

EXAMPLE II

Two cathodes were prepared. A prior art cathode having only SVO as an active material was used. In particular, a total of 0.82 grams of an SVO cathode mix similar to that described in Example I having a theoretical capacity of 243 mAh was pressed on both sides of a titanium current collector under 32 tons. The resulting cathode no. 2 had a thickness of about 0.44 mm excluding the thickness of current collector.

Cathode no. 3 according to the present invention had 0.30 grams of the same SVO mix used to construct cathode no. 2 placed on one side of a titanium current collector and 0.3 grams of a CF$_x$ mix similar to that described in Example I placed on the other side of the current collector. Cathode no. 3 was pressed under 32 tons and had a theoretical capacity of 333 mAh. Cathode no. 3 had a thickness of about 0.47 mm excluding the current collector.

Two jar cells nos. 2 and 3 having respective cathodes nos. 2 and 3 were constructed and discharged in a similar manner as described in Example I. The resulting discharge data is summarized in FIGS. 2 and 3.

Figure 2:
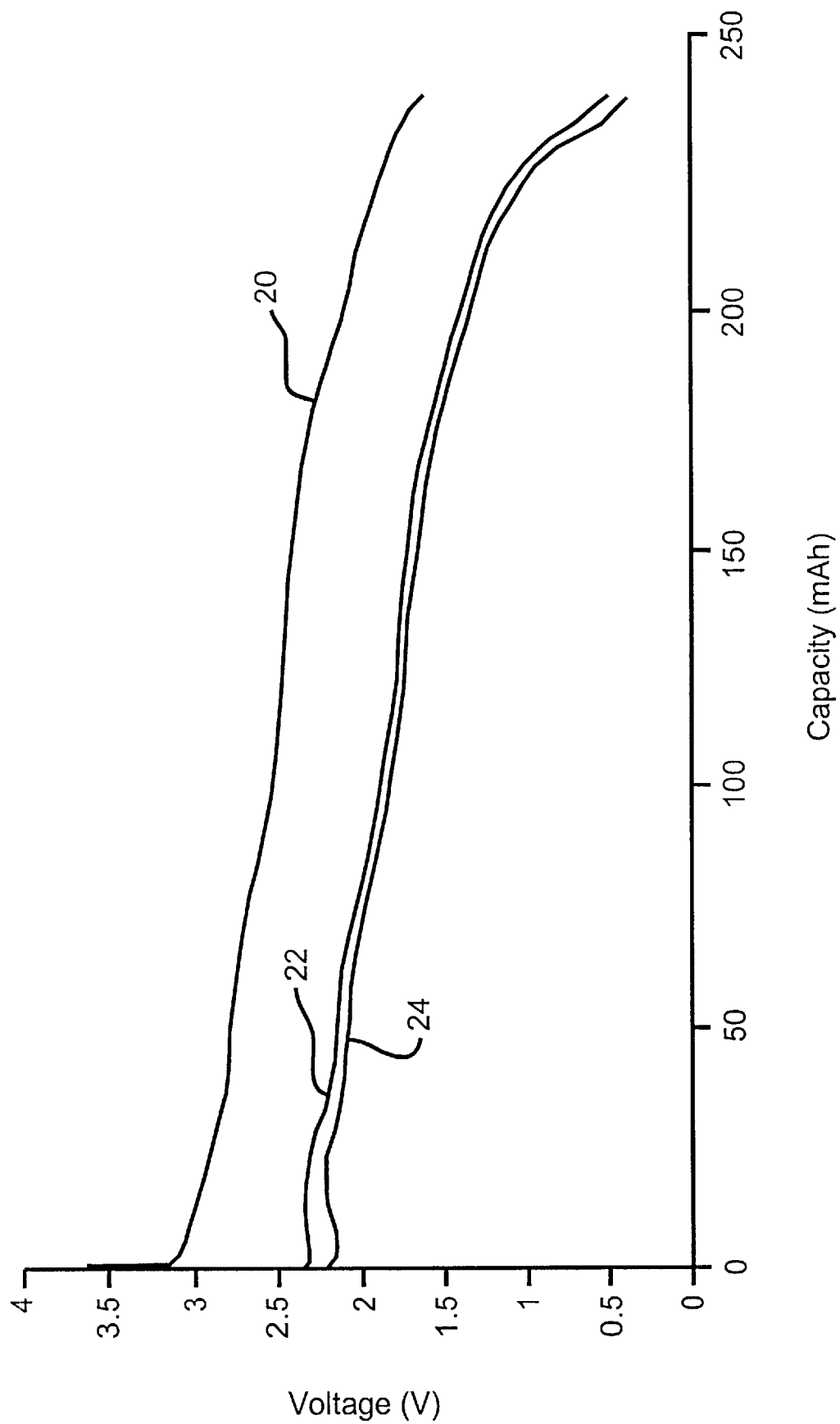
FIG. 2 is a graph of the pulse discharge results of a prior art Li/SVO cell.

FIG. 2 shows the discharge results of the prior art cell no. 2 having cathode no. 2, wherein curve 20 is the background voltage, curve 22 is the pulse 1 minima and curve 24 is the pulse 4 minima. A typical SVO cell discharge voltage profile vs. capacity was observed. High discharge rate capability was evidenced by the achievement of high pulse minimum potentials. The delivered capacity of approximately 230 mAh to a 2.0V background cut off was very close to the theoretical capacity.

Figure 3:
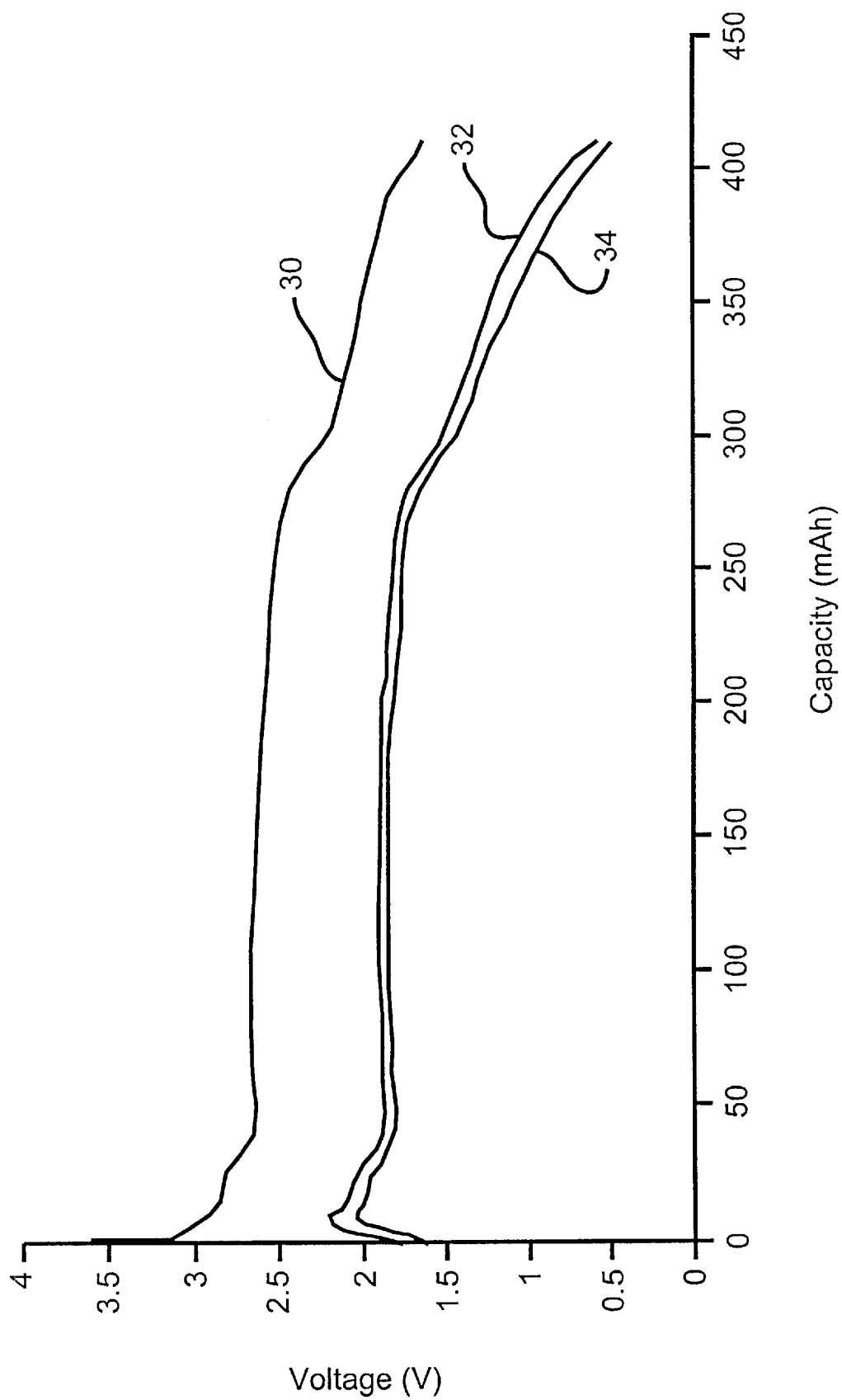
FIGS. 3 and 4 are graphs of the pulse discharge results of present invention lithium cells having cathodes of: SVO/current collector/$CF_x$.

FIG. 3 presents the discharge voltage profile of cell no. 3 with the sandwich cathode no. 3 of the present invention, wherein curve 3 is the background voltage, curve 32 is the pulse 1 minima and curve 34 is the pulse 4 minima. The discharge voltage profile can be divided into three region. Within the initial 40 mAh, a typical SVO cell discharge profile (background voltage and pulse minimum voltage) was observed. From about 40 mAh to about 300 mAh, the background voltage profile was very similar to that of a typical $CF_x$ cells. In addition, the pulse minimum potentials were maintained at a level characteristic for SVO cells. However, for the region from about 300 mAh and greater, a typical SVO cell voltage profile was again observed. Cell no. 3 delivered approximately 360 mAh to a 2.0V background voltage cut off, which exceeds the theoretical capacity.

The discharge results set forth in this example clearly demonstrate that the SVO/$CF_x$ sandwich cathode cell no. 3 delivered more capacity (1.56 times) than that of the prior art cell no. 2 at the 2.0V background voltage cut off. Using a pulse minimum potential of 1.5V as an arbitrary cut off, prior art cell no. 2 delivered approximately 195 mAh, (80% theoretical capacity) while the present invention cell no. 3 delivered approximately 295 mAh. (89% of theoretical capacity). The ratio of delivered capacity is about 1.51 times as great for the present invention cell in comparison to the prior art cell, which is an increase of 50% delivered capacity. More importantly, a higher percentage of theoretical capacity was delivered by cell no. 3 than by cell no. 2.

EXAMPLE III

Another lithium electrochemical cell according to the present invention contained sandwich cathode no. 4 having 0.30 grams of an SVO mix similar to that described in Example I. The SVO mix was placed on one side of a titanium current collector. The other side of the current collector supported 0.5 grams of a $CF_x$ mix similar to that described in Example II. Cathode no. 4 was pressed under 32 tons and had a theoretical capacity of 496 mAh. Cathode no. 4 had a thickness of about 0.68 mm excluding the current collector.

A jar cell no. 4 incorporating sandwich cathode no. 4 was discharged in a similar manner as cell no. 1 in Example I, except that the pulse current was increased to 157 mAh (35 mA/cm$^2$). The resulting discharge data is summarized in FIG. 4, wherein curve 40 is the background voltage, curve 42 is the pulse 1 minima and curve 44 is the pulse 4 minima.

Figure 4:
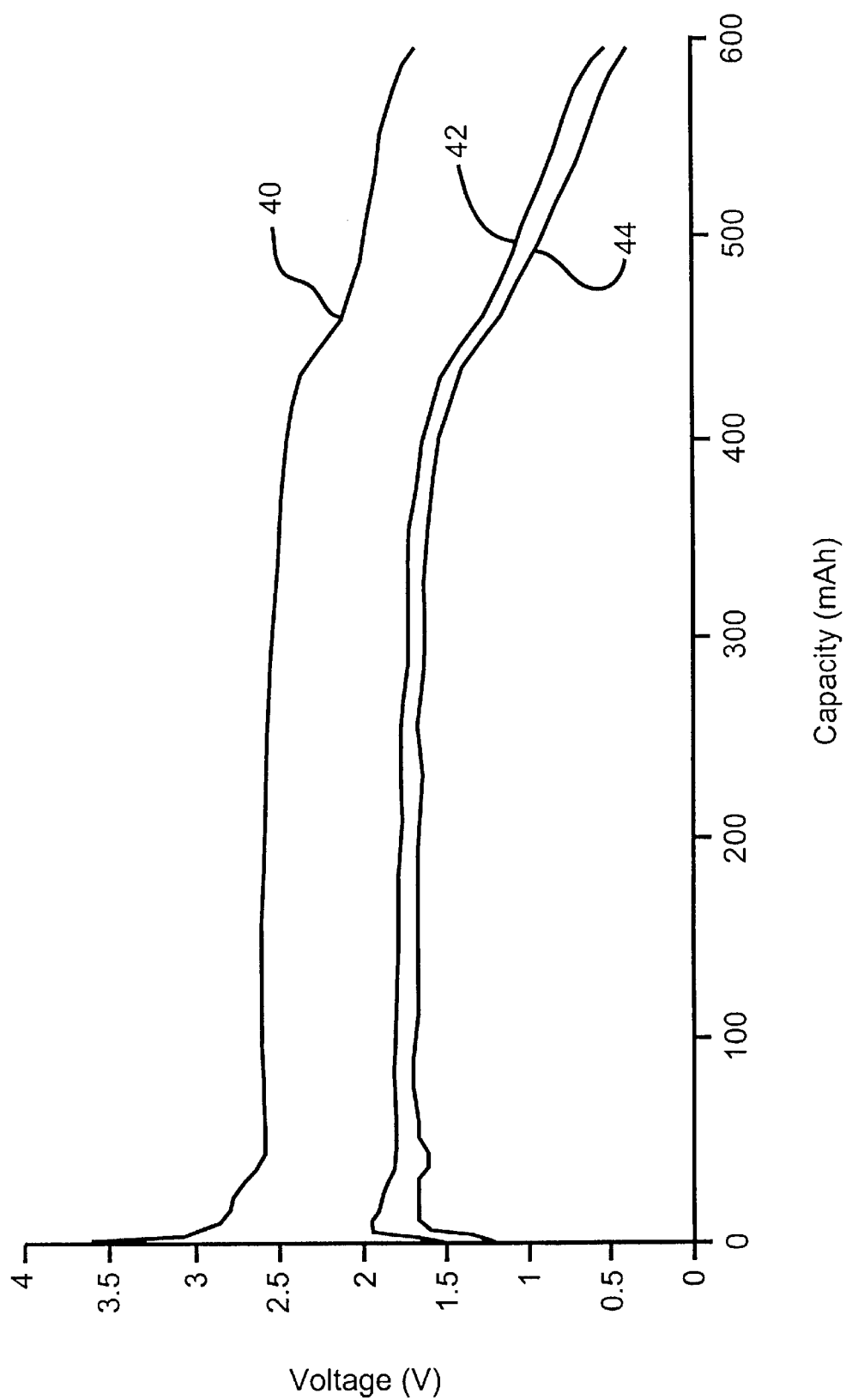

In FIG. 4, the background voltage profile is similar to that shown in FIGS. 1 and 3. The only significant difference is the slightly lower pulse minimum potentials due to the higher pulse current density. However, the cell delivered approximately 515 mAh at a 2.0V background voltage cut off, which is slightly greater than the theoretical capacity. The present invention cell no. 4 also delivered approximately 414 mAh to a 1.5V pulse minimum potential cut off, which is 83% of the theoretical capacity. This example demonstrates that a lithium cell having a SVO/$CF_x$ sandwich cathode is dischargable under higher current density, just like a prior art Li/SVO cell.

EXAMPLE IV

A prior art lithium cell was constructed incorporating a sandwich cathode no. 5 having a total of 0.2 grams of $CF_x$ cathode mix pressed on both sides of a titanium cathode screen under 32 tons. The $CF_x$ mix was similar to that described in Example I. Thus, the current collector surface was essentially covered by the $CF_x$ mix. Then, 0.6 grams of a SVO mix similar to that described in Example I was pressed on both sides of the current collector on top of the $CF_x$ mix under 32 tons. The resulting cathode no. 5 had a theoretical capacity of 340 mAh. Essentially, the cathode had a sandwich structure in which $CF_x$ was positioned between SVO on both sides of the current collector. The only difference between this electrode and cathodes nos. 1, 3 and 4 described in Examples I, II and III is that the SVO mix did not have direct contact with the cathode screen.

A jar cell no. 5 was prepared containing cathode no. 5. In particular, both sides of the cathode faced a lithium metal anode with two layers of polypropylene separator between the cathode and the anode. Cell no. 5 was then activated with a nonaqueous electrolyte of 1.0M LiAsF$_6$/PC:DME=1.1. This cell was pulse discharged under a 228 mA load (25.4 mA/cm$^2$) with pulse trains applied every 30 minutes. The discharge test results are shown in FIG. 5, wherein curve 50 is the background voltage, curve 52 is the pulse 1 minima and curve 54 is the pulse 4 minima.

Figure 5:
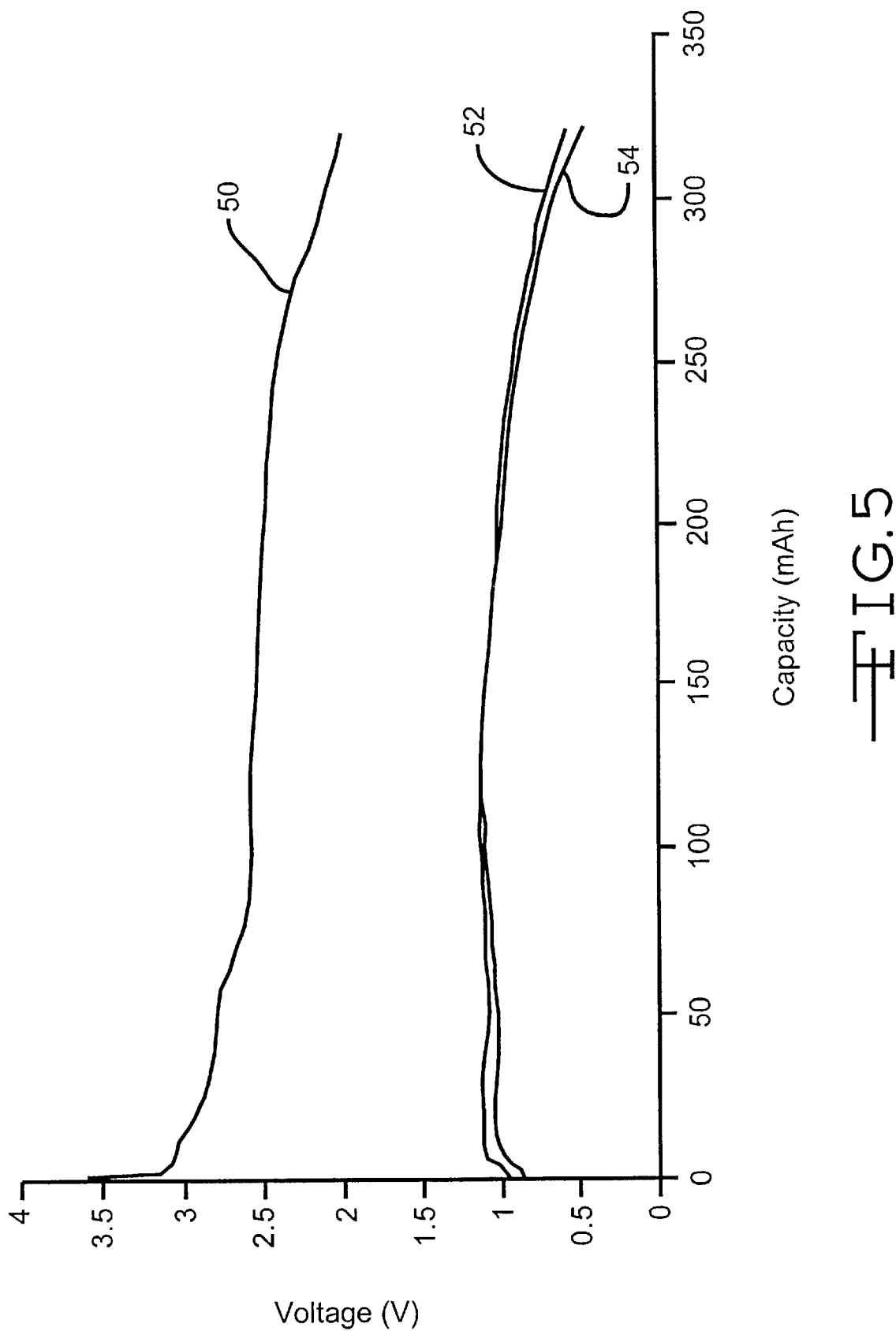
FIG. 5 is a graph of the pulse discharge results of a prior art Li/$CF_x$ cell.

The pre-pulse voltage profile in FIG. 5 is very similar to that shown in FIGS. 1, 3 and 4. The theoretical capacity was achieved at a 2.0V background cut off. However, the pulse minimum potential profiles presented significantly lower pulse minimum potentials in FIG. 5 than in FIGS. 1, 3 and 4. Also, a larger Rdc was observed in this example than in Examples I, II and III. This example demonstrates that direct contact of the SVO material with the current collector screen is very critical in maintaining a low Rdc and high pulse minimum potentials.

The above discussion discloses the concept of sandwich electrode design in a lithium electrochemical cell capable of delivering high discharge capacity. With the sandwich design of the present invention, the high volumetric capacity $CF_x$ active material is quantitatively converted into or used as high power energy of the SVO material. It is believed that during high energy pulsing, all the discharge energy is provided by the SVO material. Above the discharge voltage of the $CF_x$ electrode material, only SVO electrode material is discharged with the SVO material providing all of the discharge energy for pulsing as well as for any background load discharging. Under these discharge conditions, the $CF_x$ active material is polarized with respect to the SVO material discharge voltages. Then, when the lithium cells having the sandwich cathodes of the present invention are discharged to the working voltage of the $CF_x$ material, both the SVO and $CF_x$ active materials provide the energy for background load discharging. However, only the SVO material provides energy for high rate pulse discharging. After the SVO active material is pulse discharged, the potential of SVO material tends to drop due to the loss of capacity. When the SVO background voltage drops below the working voltage of the $CF_x$ material, the SVO material is believed to be charged by the $CF_x$ material to bring the discharge voltage of the sandwich cathode materials to an equal value. Therefore, it is believed that the SVO material acts as a rechargeable electrode while at the same time the $CF_x$ material acts as a charger or energy reservoir. As a result, both active materials reach end of service life at the same time.

EXAMPLE V

Two cathodes were prepared. A prior art cathode no. 6 contained 1.00 grams of pure Ag$_2$O active material having a theoretical capacity of 230 mAh. This material was pressed on both sides of a titanium current collector under 32 tons. A present invention cathode no. 7 contained 0.30 grams of a SVO mix similar to that described in Example I placed on one side of a titanium current collector, and 1.0 grams of pure Ag$_2$O placed on the other side of the current collector. Cathode no. 7 was pressed under 32 tons and had a theoretical capacity of 89 mAh attributed to the SVO and 230 mAh attributed to Ag$_2$O material for a total capacity of 319 mAh.

Jar cells were constructed. For cell no. 7, only the SVO side of cathode no. 7 faced the lithium anode. The electrodes were separated by two layers of micro-porous membrane polypropylene separator and activated with a nonaqueous electrolyte of 1.0M LiAsF$_6$/PC:DME=1:1. The cells were pulse discharged in a similar manner as described in Example I.

For cell no. 6 containing cathode no. 6 having the pure Ag$_2$O active material, the pulse minimum voltages dropped below 1.2 volt on the very first pulse train. The pulse minimum voltage dropped below 0.5V in the third pulse train. This demonstrates that Ag$_2$O active material essentially delivers no capacity under high rate discharge. This active material does not have the right rate capability.

Figure 6:
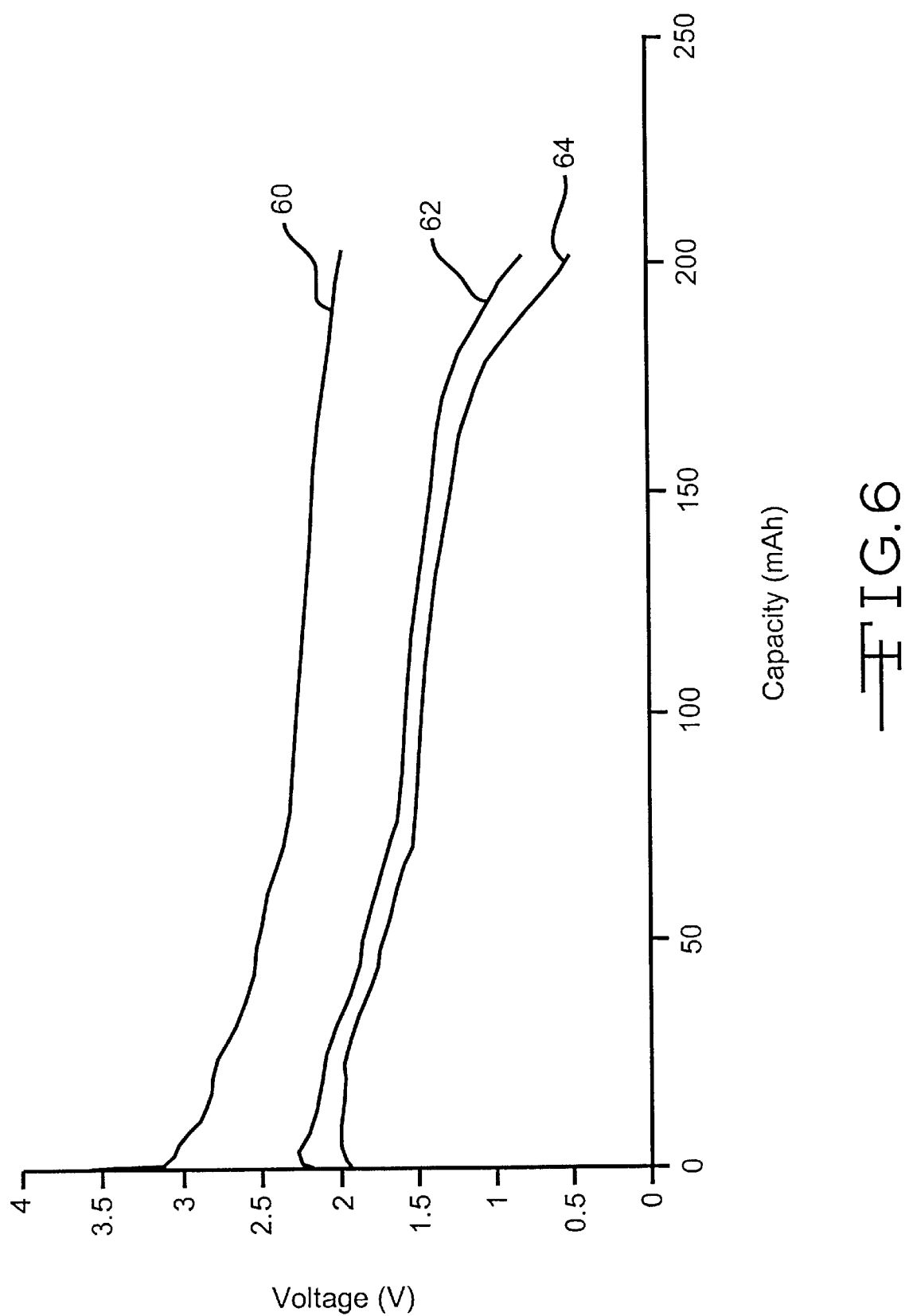
FIG. 6 is a graph of the pulse discharge results of a present invention lithium cell having a cathode of: SVO/current collector/$Ag_2O$.
Figure 7:
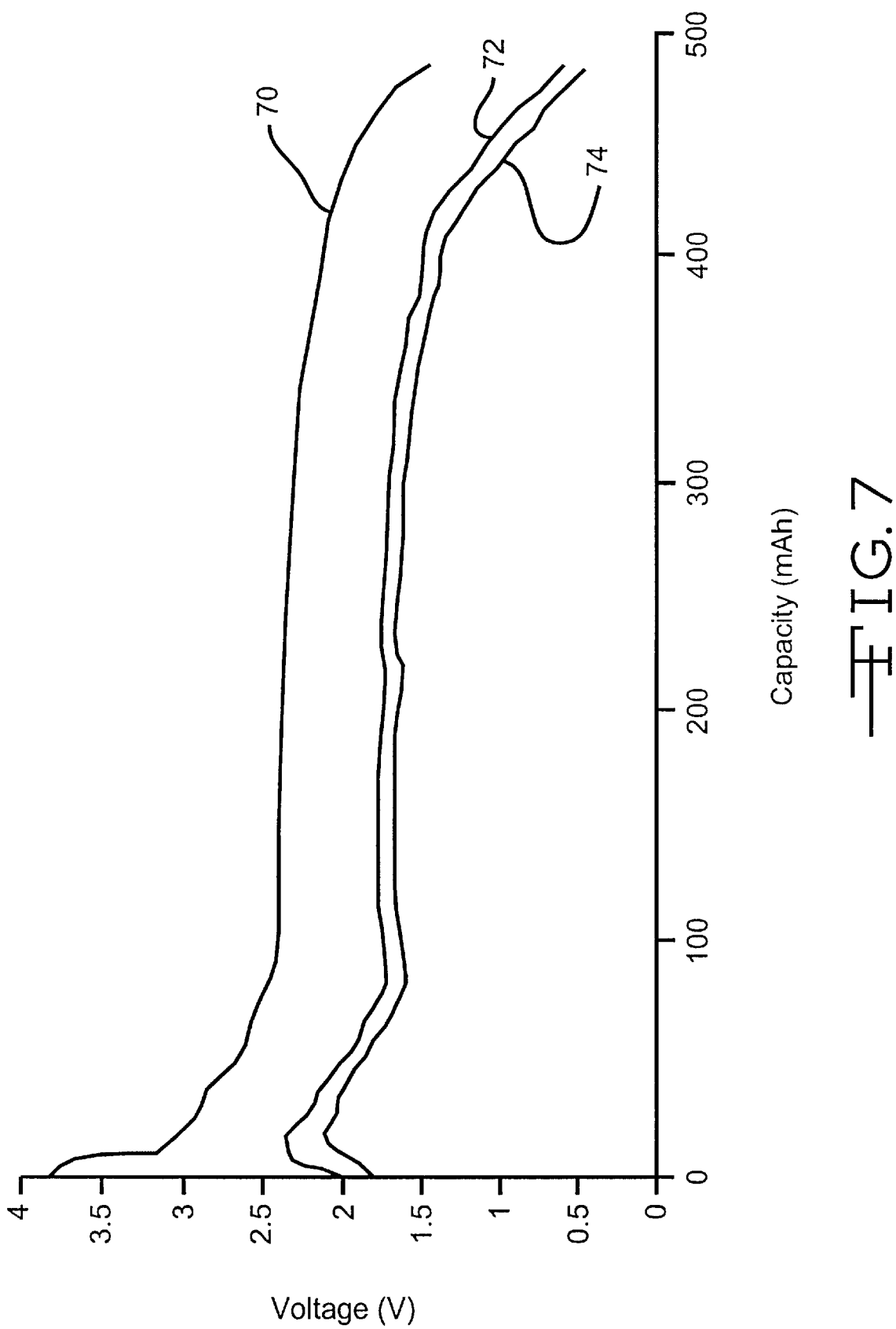
FIG. 7 is a graph of the pulse discharge results of a present invention lithium cell having a cathode of: SVO/current collector/$Ag_2O_2$.

For cell no. 7 with cathode no. 7, 161 pulse trains were delivered to the 0.5V pulse minimum voltage cut off, as illustrated in FIG. 6, wherein curve 60 is the background voltage, curve 62 is the pulse 1 minima and curve 64 is the pulse 4 minima. Other than the typical Li/SVO cell discharge voltage profile seen at the early stage of cell discharge, a voltage plateau at around 2.2V was observed. A total discharge capacity of 204 mAh was delivered. Although this capacity is much lower than the calculated theoretical capacity of 319 mAh, it is much higher than the calculated theoretical capacity of the SVO part of the cathode (89 mAh). Thus, the 115 mAh or 50% of the theoretical capacity of Ag$_2$O active material was delivered under high discharge rate.

EXAMPLE VI

Two cathodes were prepared. Prior art cathode no. 8 contained 1.00 gram of pure Ag$_2$O$_2$ having a theoretical capacity of 430 mAh. This material was pressed on both sides of a titanium current collector under 32 tons. A present invention cathode no. 9 contained 0.30 grams of a SVO mix similar to that described in Example I placed on one side of a titanium current collector, and 1.0 grams of pure Ag$_2$O$_2$ placed on the other side of the current collector. This cathode was pressed under 32 tons and had a theoretical capacity of 89 mAh attributed to the SVO material and 430 mAh attributed to the Ag$_2$O for a total of 519 mAh of deliverable capacity.

Jar cells were constructed having the respective cathode nos. 8 and 9 coupled with a lithium anode. In cell no. 9, only the SVO side of cathode no. 9 faced the lithium anode. The electrodes were separated by two layers of micro-porous membrane polypropylene separator and the cells were activated with a nonaqueous electrolyte of 1.0M LiAsF$_6$/PC:DME=1:1. The cells were then pulse discharged in a similar manner as described in Example I.

For cell no. 8 incorporating cathode no. 8, the pulse minimum potentials dropped below 1.0V in the first pulse train. The voltages dropped below 0.5V cut off in the second pulse train. This proved that the Ag$_2$O$_2$ active material by itself does not have high discharge rate capacity.

Cell no. 9 incorporating cathode no. 9 delivered 380 pulse trains to a 0.5V pulse minimum voltage cut off, as shown in FIG.. 7, wherein curve 70 is the background voltage, curve 72 is the pulse 1 minima and curve 74 is the pulse 4 minima. Other than the typical Li/SVO cell discharge profile, a voltage plateau between about 2.2V to 2.4V was observed. A total of 481 mAh capacity was delivered by cell no. 9. This delivered capacity is 92.7% of the calculated theoretical capacity of 519 mAh for such a cell chemistry. At 2.0V background voltage cut off, the cell delivered around 435 mAh of capacity, which is 84% of the theoretical capacity for such a cell. Since SVO generally delivers 100% of its theoretical capacity at a 2.0V background voltage cut off, the delivered capacity efficiency of the Ag$_2$O$_2$ active material is calculated to be about 81%.

The discharge results in this example demonstrate that the available capacity of a typical low rate active material, for example Ag$_2$O$_2$, is deliverable under a high discharge rate in a lithium cell having a sandwich cathode design according to the present invention.

EXAMPLE VII

Examples I to VI describe the test results of jar cells. In these examples, the sandwich electrode design of the present invention was tested in a half-sandwich electrode configuration. In other words, the cathodes in the above jar cells were prepared by pressing SVO on one side of a titanium current collector and CF$_x$ (or Ag$_2$O or Ag$_2$O$_2$) on the other side. In the previously described jar cell tests, only the SVO side of the cathode faced the lithium anode.

In this example, hermetic lithium cells were constructed having cathodes designed in a full sandwich configuration. For all of the cells, lithium anode material was pressed on nickel current collector screen. The cathodes consisted of two titanium current collector screens having the configuration of SVO/screen/(second cathode material)/screen/SVO. The second cathode material was either CF$_x$ or Ag$_2$O$_2$. The control cell cathodes were prepared in the conventional configuration of SVO/screen/SVO. In any event, the test cells were assembled in a prismatic configuration having two layers of micro-porous membrane polypropylene separator sandwiched between the anode and cathode. This electrode assembly was then hermetically sealed in a stainless steel casing in a case negative configuration and activated with the electrolyte.

Cell no. 10 was a control cell with a standard cathode configuration of: SVO/current collector/SVO. Six of the standard cathodes were used to build cell no. 10. Each cathode contained 1.248 grams of a SVO mix similar to that described in Example I. The theoretical capacity of the cell no. 10 was calculated to be 2.217 Ah.

Cell no. 11 was built according to the present invention with a cathode of: SVO/current collector/CF$_x$/current collector/SVO. Six of the sandwich electrodes were used to build the cell. Each electrode contains 0.3 grams of the CF$_x$ mix described in Example II, and 0.662 grams of the SVO mix. The theoretical capacity of the cell no. 11 was calculated to be 2.645 Ah.

Cell no. 12 was built according to the present invention with a cathode of: SVO/current collector/Ag$_2$O$_2$/current collector/SVO. Six of the sandwich electrodes were used to build the cell. Each electrode contained 1.0 grams of pure Ag$_2$O$_2$, and 0.662 grams of the SVO mix. The theoretical capacity of the cell was calculated to be 3.758 Ah.

Cells nos. 10 to 12 were pulse discharged under 2.0 Amp pulsing current (22.2 mA/cm$^2$). Pulse trains consisted of four 10 second pulses with 15 second rest between the pulses. The pulse trains were applied to the cells every 30 minutes. The pulse discharge test was stopped when the pulse minimum potentials dropped below 1.5V. The delivered capacities and relative comparisons at three voltage cut off are summarized in Table 3.

For cell no. 11 with $CF_x$ as the second cathode material, the delivered capacities at all three voltage cut off was significantly higher than that of the control cell no. 10. For cell no. 12 with $Ag_2O_2$ as the second cathode active material, the delivered capacity at 2.0V was lower than that of cell no. 10. However, the delivered capacities at a 1.7V and 1.5V cut off were higher than that of the control cell no. 10.

TABLE 3

| Cell | Capacity at cut off (Ah) | | | Relative % at cut off | | |
|---|---|---|---|---|---|---|
| No. | 2.0 V | 1.7 V | 1.5 V | 2.0 V | 1.7 V | 1.5 V |
| 10 | 0.911 | 1.600 | 1.756 | 100% | 100% | 100% |
| 11 | 2.067 | 2.356 | 2.533 | 227% | 147% | 144% |
| 12 | 0.622 | 1.711 | 2.578 | 68% | 107% | 147% |

The discharge results in this example demonstrate that the present sandwich cathode design not only improves discharge capacity in experimental jar cells with half sandwich cathodes, but the present design is also useful in hermetically sealed electrochemical cells having full sandwich cathodes. For a lithium cell containing $CF_x$ as the second cathode active material, such a cell is capable of delivering 44% more discharge capacity to a 1.5V cut off and 127% more capacity to a 2.0V cut off than a conventional Li/SVO cell under the same high rate discharge conditions. For a lithium sandwich cell containing $Ag_2O_2$ as the second cathode active material, such a cell is capable of delivering 7% more discharge capacity to a 1.7V cut off and 47% more delivered capacity to a 1.5V cut off than that of a conventional Li/SVO cell under the same discharge conditions.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) an anode;
   b) a cathode of a first cathode active material different than a second cathode active material, the first cathode active material being of a first energy density and a first rate capability and the second cathode active material being of a second energy density and a second rate capability, and wherein the cathode further comprises first and second current collectors with the second cathode active material sandwiched between the current collectors and with the first cathode active material contacting the first and second current collectors opposite the second cathode active material, and wherein the first energy density of the first cathode active material is less than the second energy density of the second cathode active material while the first rate capability of the first cathode active material is greater than the second rate capability of the second cathode active material; and
   c) an electrolyte activating the anode and the cathode.

2. The electrochemical cell of claim 1 wherein the first cathode active material is selected from the group consisting of $CF_x$, $Ag_2O$, $Ag_2O_2$, CuF, $Ag_2CrO_4$, $MnO_2$, SVO, and mixtures thereof.

3. The electrochemical cell of claim 1 wherein the second cathode active material is selected from the group consisting of SVO, CSVO, $V_2O_5$, $MnO_2$, $LiCoO_2$, $LiNiO_2$, $LiMnO_2$, $CuO_2$, TiS, $Cu_2S$, FeS, $FeS_2$, copper oxide, copper vanadium oxide, and mixtures thereof.

4. The electrochemical cell of claim 1 wherein the cathode has the configuration: SVO/first current collector/$CF_x$/second current collector/SVO.

5. The electrochemical cell of claim 1 wherein the cathode has the configuration: SVO/first current collector/SVO/$CF_x$/SVO/second current collector/SVO.

6. The electrochemical cell of claim 1 wherein the anode is of an alkali metal.

7. The electrochemical cell of claim 1 wherein the electrolyte is a nonaqueous electrolyte.

8. An electrochemical cell, which comprises:
   a) an anode;
   b) a cathode of SVO as a first cathode active material and $CF_x$ as a second cathode active material, wherein the second cathode active material is sandwiched between a first and second current collectors with the first cathode active material contacting the first and second current collectors opposite the second cathode active material; and
   c) an electrolyte activating the anode and the cathode.

9. The electrochemical cell of claim 8 wherein the first and second current collectors are selected from the group consisting of stainless steel, titanium, tantalum, platinum, gold, aluminum, cobalt nickel alloys, nickel-containing alloys, highly alloyed ferritic stainless steel containing molybdenum and chromium, and nickel-, chromium-, and molybdenum-containing alloys.

10. The electrochemical cell of claim 8 wherein the first and second current collectors are titanium having a coating selected from the group consisting of graphite/carbon material, iridium, iridium oxide and platinum provided thereon.

11. The electrochemical cell of claim 8 wherein the anode is lithium and the first and second current collectors are titanium.

12. The electrochemical cell of claim 8 wherein the cathode has the configuration: SVO/first titanium current collector/$CF_x$/second titanium current collector/SVO.

13. The electrochemical cell of claim 8 wherein the cathode has the configuration: SVO/first titanium current collector/SVO/$CF_x$/SVO/second titanium current collector/SVO.

14. The electrochemical cell of claim 8 wherein the electrolyte has a first solvent selected from an ester, a linear ether, a cyclic ether, a dialkyl carbonate, and mixtures thereof, and a second solvent selected from a cyclic carbonate, a cyclic ester, a cyclic amide, and mixtures thereof.

15. The electrochemical cell of claim 14 wherein the first solvent is selected from the group consisting of tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof, and the second solvent is selected from the group consisting of propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof.

16. The electrochemical cell of claim 8 including a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC6F_5SO_3$, $LiO_2CCF_3$, $LiSO_6F$, $LiB(C_6H_5)_4$ and $LiCF_3SO_3$, and mixtures thereof.

17. The electrochemical cell of claim 8 wherein the electrolyte is 0.8M to 1.5M LiAsF$_6$ or LiPF$_6$ dissolved in a 50:50 mixture, by volume, of propylene carbonate as the first solvent and 1,2-dimethoxyethane as the second solvent.

18. The electrochemical cell of claim 8 wherein the anode is of an alkali metal.

19. The electrochemical cell of claim 8 wherein the electrolyte is a nonaqueous electrolyte.

20. An electrochemical cell, which comprises:
 a) an anode of an alkali metal;
 b) a cathode of a first cathode active material selected from the group consisting of SVO, CSVO, V$_2$O$_5$, MnO$_2$, LiCoO$_2$, LiNiO$_2$, LiMnO$_2$, CuO$_2$, TiS$_2$, Cu$_2$S, FeS, FeS$_2$, copper oxide, copper vanadium oxide, and mixtures thereof, different than a second cathode active material, the first cathode active material being of a first energy density and a first rate capability and the second cathode active material being of a second energy density and a second rate capability, and wherein the cathode further comprises first and second current collectors with the second cathode active material sandwiched between the current collectors and with the first cathode active material contacting the first and second current collectors opposite the second cathode active material, and wherein the first energy density of the first cathode active material is less than the second energy density of the second cathode active material while the first rate capability of the first cathode active material is greater than the second rate capability of the second cathode active material; and
 c) a nonaqueous electrolyte activating the anode and the cathode.

21. The electrochemical cell of claim 20 wherein the first cathode active material is selected from the group consisting of CF$_x$, Ag$_2$O, Ag$_2$O$_2$, CuF, Ag$_2$CrO$_4$, MnO$_2$, SVO, and mixtures thereof.

22. The electrochemical cell of claim 20 wherein the current collector is selected from the group consisting of stainless steel, titanium, tantalum, platinum, gold, aluminum, cobalt nickel alloys, nickel-containing alloys, highly alloyed ferritic stainless steel containing molybdenum and chromium, and nickel-, chromium-, and molybdenum-containing alloys.

23. An electrochemical-cell, which comprises:
 a) a lithium anode;
 b) a cathode of a first cathode active material selected from the group consisting of CF$_x$, Ag$_2$O, Ag$_2$O$_2$, CuF, Ag$_2$CrO$_4$, MnO$_2$, SVO, and mixtures thereof, sandwiched between a first and second titanium current collectors with a second cathode active material selected from the group consisting of SVO, CSVO, V$_2$O$_5$, MnO$_2$, LiCoO$_2$, LiNiO$_2$, LiMnO$_2$, CuO$_2$, TiS, Cu$_2$S, FeS, FeS$_2$, copper oxide, copper vanadium oxide, and mixtures thereof, contacting the first and second current collectors opposite the first cathode active material; and
 c) a nonaqueous electrolyte activating the anode and the cathode.

24. A method for powering an implantable medical device, comprising the steps of:
 a) providing the medical device;
 b) providing an electrochemical cell, comprising the steps of:
  i) providing an anode;
  ii) providing a cathode of a first cathode active material different than a second cathode active, material, the first cathode active material of a first energy density and a first rate capability and the second cathode active material of a second energy density and a second rate capability, and wherein the cathode further comprises first and second current collectors with the second cathode active material sandwiched between the current collectors and with the first cathode active material contacting the first and second current collectors opposite the second cathode active material, and wherein the first energy density of the first cathode active material is less than the second energy density of the second cathode active material while the first rate capability of the first cathode active material is greater than the second rate capability of the second cathode active material, and
  iii) activating the anode and cathode with an electrolyte; and
 c) electrically connecting the electrochemical cell to the medical device.

25. The method of claim 24 including selecting the first cathode active material from the group consisting of CF$_x$, Ag$_2$O, Ag$_2$O$_2$, CuF, Ag$_2$CrO$_4$, MnO$_2$, SVO, and mixtures thereof.

26. The method of claim 24 including selecting the second cathode active material from the group consisting of SVO, CSVO, V$_2$O$_5$, MnO$_2$, LiCoO$_2$, LiNiO$_2$, LiMnO$_2$, CuO$_2$, TiS, Cu$_2$S, FeS, FeS$_2$, copper oxide, copper vanadium oxide, and mixtures thereof.

27. The method of claim 24 wherein the anode is lithium, the first cathode active material is CF$_x$, the second cathode active material is SVO.

28. The method of claim 24 including providing the cathode having the configuration: SVO/first current collector/CF$_x$/second current collector/SVO.

29. The method of claim 24 including providing the cathode having the configuration: SVO/first current collector/SVO/CF$_x$/SVO/second current collector/SVO.

30. The method of claim 24 including providing the anode of an alkali metal.

31. The method of claim 24 including providing the electrolyte a nonaqueous electrolyte.

32. An electrochemical cell, which comprises:
 a) an anode;
 b) a cathode of a first cathode active material different than a second cathode active material, the first cathode active material of a first energy density and a first rate capability and the second cathode active material of a second energy density and a second rate capability, wherein the second cathode active material has spaced apart first and second major sides with at least one current collector contacting each of the first and second major sides and wherein the first cathode active material is contacted to the at least one current collector opposite the second cathode active material and faces the anode; and
 c) an electrolyte activating the anode and the cathode.

33. The electrochemical cell of claim 32 wherein the anode is lithium and the cathode has the configuration: SVO/current collector/CF$_x$/current collector/SVO.

* * * * *

UNITED STATES PATENT AND TRADEMARK OFFICE
CERTIFICATE OF CORRECTION

PATENT NO. : 6,551,747 B1
DATED : April 22, 2003
INVENTOR(S) : Gan

It is certified that error appears in the above-identified patent and that said Letters Patent is hereby corrected as shown below:

Column 13,
Line 59, delete "first" and insert -- second --.
Line 63, delete "second" and insert -- first --.

Column 15,
Line 35, delete "first" and insert -- second --.
Line 48, after "material" insert -- different than a second cathode active material, wherein the second cathode active material is --.
Line 52, delete "a second" and insert -- the first --, and insert -- being -- after "material".
Line 54, delete "TiS" and insert -- $TiS_2$ --.
Line 56, after "thereof," insert -- and --.
Line 57, delete "first" and insert -- second --.

Column 16,
Line 3, delete the comma between "active" and "material".
Line 24, delete "first" and insert -- second --.
Line 28, delete "second" and insert -- first --.
Line 30, delete "TiS" and insert -- TiS2 --.
Line 34, delete "$CF_x$" and insert -- SVO --.
Line 35, delete "SVO" and insert -- $CF_x$ --.

Signed and Sealed this

Twenty-seventh Day of January, 2004

JON W. DUDAS
*Acting Director of the United States Patent and Trademark Office*